(12) United States Patent
Park (10) Patent No.: US 7,972,052 B2
(45) Date of Patent: Jul. 5, 2011

(54) BACKLIGHT UNIT

(75) Inventor: Seong-Ha Park, Suwon-si (KR)

(73) Assignee: Samsung Electronics Co., Ltd., Maetan-Dong, Yeongtong-Gu, Suwon-Si, Gyeonggi-Do (KR)

( * ) Notice: Subject to any disclaimer, the term of this patent is extended or adjusted under 35 U.S.C. 154(b) by 361 days.

(21) Appl. No.: 12/211,916

(22) Filed: Sep. 17, 2008

(65) Prior Publication Data

US 2009/0122517 A1    May 14, 2009

(30) Foreign Application Priority Data

Nov. 9, 2007    (KR) .................. 10-2007-0114032

(51) Int. Cl.
 *F21V 7/04* (2006.01)
(52) U.S. Cl. .................. 362/620; 362/626; 362/339
(58) Field of Classification Search .................. 362/620, 362/626, 339
See application file for complete search history.

(56) References Cited

U.S. PATENT DOCUMENTS

| | | | | |
|---|---|---|---|---|
| 7,220,026 B2* | 5/2007 | Ko et al. | ...... | 362/339 |
| 7,364,341 B2* | 4/2008 | Parker et al. | ...... | 362/620 |
| 7,458,714 B2* | 12/2008 | Chang | ...... | 362/626 |
| 7,553,050 B2* | 6/2009 | Hwang et al. | ...... | 362/330 |
| 2004/0095744 A1* | 5/2004 | Yu et al. | ...... | 362/31 |
| 2007/0171671 A1* | 7/2007 | Kurokawa et al. | ...... | 362/606 |

FOREIGN PATENT DOCUMENTS

| | | |
|---|---|---|
| CN | 101051098 | 10/2007 |
| JP | 2006-196384 | 7/2006 |

* cited by examiner

*Primary Examiner* — Thomas M Sember
(74) *Attorney, Agent, or Firm* — Cha & Reiter, LLC (57) ABSTRACT

A backlight unit including a light guide panel which has opposite upper and lower faces, and guides light, introduced into an inside thereof, between the upper and lower faces through internal reflection, and a prism sheet which collects and transmits the light, introduced from the light guide panel, and has, on its surface, a plurality of prism patterns, each having a first main inclined face, to which light introduced from the light guide panel is incident, a second main inclined face having a curvature or a plane which reflects light incident from the first main inclined face, and two auxiliary inclined faces which are opposite to each other between the first and second main inclined faces, and define a side face of the prism pattern.

12 Claims, 9 Drawing Sheets

| Vertical angle | LUMINANCE Cd/m² (RELATIVE VALUE) |
|---|---|
| 30 | 2609 |
| 40 | 2388 |
| 50 | 2206 |
| 60 | 2117 |
| 68 | 1987 |

| Angle [deg] | | INCIDENT ANGLE[deg]: ANGLE (70-80deg) OF LIGHT EMITTED FROM LIGHT GUIDE PANEL | | | | | |
| --- | --- | --- | --- | --- | --- | --- | --- |
| | | 70 | 72 | 74 | 76 | 78 | 80 |
| ANGLE BETWEEN MAIN INCLINED FACES [deg] | 60 | 10.00 | 12.00 | 14.00 | 16.00 | 18.00 | 20.00 |
| | 61 | 8.25 | 10.24 | 12.23 | 14.22 | 16.21 | 18.19 |
| | 62 | 6.50 | 8.49 | 10.47 | 12.45 | 14.42 | 16.39 |
| | 63 | 4.78 | 6.73 | 8.71 | 10.68 | 12.64 | 14.59 |
| | 64 | 3.01 | 4.39 | 6.95 | 8.91 | 10.87 | 12.81 |
| | 65 | 1.27 | 3.24 | 5.20 | 7.16 | 9.10 | 11.31 |
| | 66 | -0.47 | 1.50 | 3.45 | 5.40 | 7.34 | 9.26 |
| | 67 | -2.21 | 0.24 | 1.70 | 3.65 | 5.58 | 7.50 |
| | 68 | -3.96 | -2.00 | 0.00 | 1.89 | 3.82 | 5.73 |
| | 69 | -5.71 | -3.74 | -1.79 | 0.14 | 2.06 | 3.97 |
| | 70 | -7.46 | -5.49 | -3.55 | -1.61 | 0.30 | 2.20 |

BACKLIGHT UNIT

CLAIM OF PRIORITY

This application claims priority to an application entitled "Backlight unit" filed in the Korean Intellectual Property Office on Nov. 9, 2007 and assigned Serial No. 2007-114032, the contents of which are hereby incorporated by reference.

BACKGROUND OF THE INVENTION

1. Field of the Invention

The present invention relates to a backlight unit (BLU) for a flat display, and more particularly to a backlight unit using a light guide panel (LGP).

2. Description of the Related Art

Generally, a flat liquid crystal display (LCD) is a non-emissive type display which is not self-luminous, and as such, it requires an external light source. In contrast, a self-emissive type display, such as a plasma display panel (PDP), a field emission display (FED), or the like, does not require an external light source. The non-emissive type display thus needs a backlight unit which constantly illuminates the whole display surface.

Figure 1:
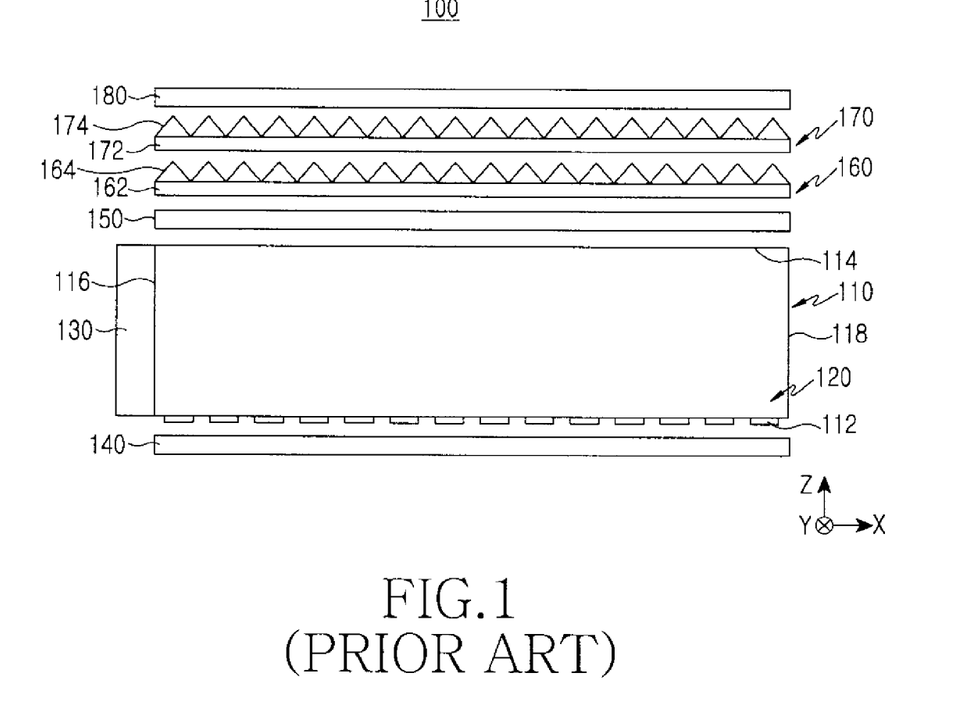
FIG. 1 is a side view illustrating a conventional backlight unit.

FIG. 1 is a side view illustrating a conventional backlight unit. As shown, the backlight unit 100 includes a reflecting sheet 140, a light source 130, a light guide panel 110, first and second diffusing sheets 150 and 180, and first and second prism sheets 160 and 170. In the figure, a Z-axis is parallel with the illuminating direction of the backlight unit 100 (i.e. a normal line to an upper face 114 of the light guide panel 110), an X-axis is parallel with the advancing direction of light emitted from the light source 130, and a Y-axis is perpendicular to the X and Z axes.

The light guide panel 110 has upper and lower faces 114 and 112 opposite to each other, and first and second side faces 116 and 118 opposite to each other. The light source 130 is positioned exactly outside the first side face 116 of the light guide panel 110, and emits light toward the first side face 116. The light guide panel 110 guides light, which is introduced into the light guide panel via the first side face 116, to the second side face 118 by means of internal reflection. The light guide panel 110 is provided, on an undersurface of the lower face 112, with a plurality of randomly-arranged dot patterns 120. The respective dot patterns 120 have a shape of a hemi-spherical groove so as to reflect and diffuse incident light. That is, the respective dot patterns 120 break a total internal reflection condition at a boundary between the light guide panel 110 and external air space so as to transmit light, reflected and diffused from the respective dot pattern 120, through the upper face 114 of the light guide panel 110. When examining luminance distribution shown on the upper face 114 of the light guide panel 110, the luminance at a viewing angle of 0° is low, and the luminance at a larger viewing angle is high. Here, the viewing angle of 0° represents the case where an observer views the light guide panel in the direction parallel with the Z-axis. In the present invention, the diffusion means scattered reflection (or scattering) at a non-optical surface, mirror reflection at a non-planar surface, and so forth.

The reflection sheet 140 is arranged such that an upper face thereof faces or confronts the lower face 112 of the light guide panel 110, so as to reflect light, which is transmitted through the dot patterns 120 of the lower face 112 of the light guide panel 110, toward the inside of the light guide panel 110.

The first diffusing sheet 150 is arranged such that a lower face thereof confronts the upper face 114 of the light guide panel 110, so as to scatter and transmit the incident light. The first and second diffusing sheets 150 and 180 each scatter the incident light so as to disperse the luminance distribution, which has been concentrated at a high viewing angle, toward the low viewing angle.

The first prism sheet 160 is arranged such that a lower face thereof confronts the upper face of the first diffusing sheet 150, and consists of a base film 162 and a plurality of prism mountains 164 protruding from an upper face of the base film 162 in such a way as to be spaced parallel with each other. Here, the respective prism mountains 164 extend parallel with the X-axis (i.e. parallel with the normal line of the first side face 116 of the light guide panel 110). The first prism sheet 160 collects, transmits, and reflects incident light on a cross sectional thereof (i.e., a Y-Z plane, or a plane perpendicular to its longitudinal direction). The first and second prism sheets 160 and 170 each serve to concentrate light on a low viewing angle, at which luminance distribution is low.

The second prism sheet 170 is arranged such that a lower face thereof confronts the upper face of the first prism sheet 160, and consists of a base film 172 and a plurality of prism mountains 174 protruding from an upper face of the base film 172 in such a way as to be spaced parallel with each other. Here, the respective prism mountains 174 extend parallel with the Y-axis (i.e. perpendicular to the normal line of the first side face 116 of the light guide panel 110). The second prism sheet 170 collects, transmits, and reflects incident light on a cross sectional thereof (i.e., an X-Z plane, or a plane perpendicular to its longitudinal direction).

The second diffusing sheet 180 is arranged such that a lower face thereof confronts the upper face of the second prism sheet 170, so as to scatter and transmit incident light.

The conventional backlight unit 100 as described above has drawbacks as follows.

First, since the backlight unit 100 has to use two high-cost prism sheets 160 and 170, thus the manufacturing cost is higher, and the thickness of the sheets make the backlight unit undesirably thicker. Further, in a case of using a prism sheet 160 or 170, the luminance of the backlight unit 100 is greatly reduced by approximately half.

Second, the multi-reflection of light generated between the first and second prism sheets 160 and 170 may cause the defect of appearance, such as a Moire interference fringe.

Third, since the backlight unit 100 has to use at least one of the diffusing sheets 150 and 180, the problem arises in that the manufacturing cost and the thickness thereof come higher and thicker, respectively. Further, the luminance of the backlight unit 100 can be also reduced by approximately 15% when using two diffusing sheets 150 and 180.

SUMMARY OF THE INVENTION

Accordingly, the present invention overcomes the above problems occurring in the related art and provides additional advantages, by providing a backlight unit with an improved optical efficiency, more economical, and better appearance.

In accordance with an aspect of the present invention, there is provided a backlight unit including: a light guide panel which has opposite upper and lower faces, and guides light, introduced into an inside thereof, between the upper and lower faces through internal reflection; and a prism sheet which collects and transmits the light, introduced from the light guide panel, and has, on its surface, a plurality of prism patterns, each having a first main inclined face, to which light introduced from the light guide panel is incident, a second main inclined face having a curvature or a plane which reflects light incident from the first main inclined face, and two auxiliary inclined faces which are opposite to each other between the first and second main inclined faces, and define a side face of the prism pattern.

BRIEF DESCRIPTION OF THE DRAWINGS

The above features and other advantages of the present invention will be more clearly understood from the following detailed description when taken in conjunction with the accompanying drawings, in which.

DETAILED DESCRIPTION OF THE INVENTION

Hereinafter, embodiments of the present invention will be described with reference to the accompanying drawings. For the purposes of clarity and simplicity, a detailed description of known functions and configurations incorporated herein will be omitted as it may make the subject matter of the present invention unclear.

Figure 2:
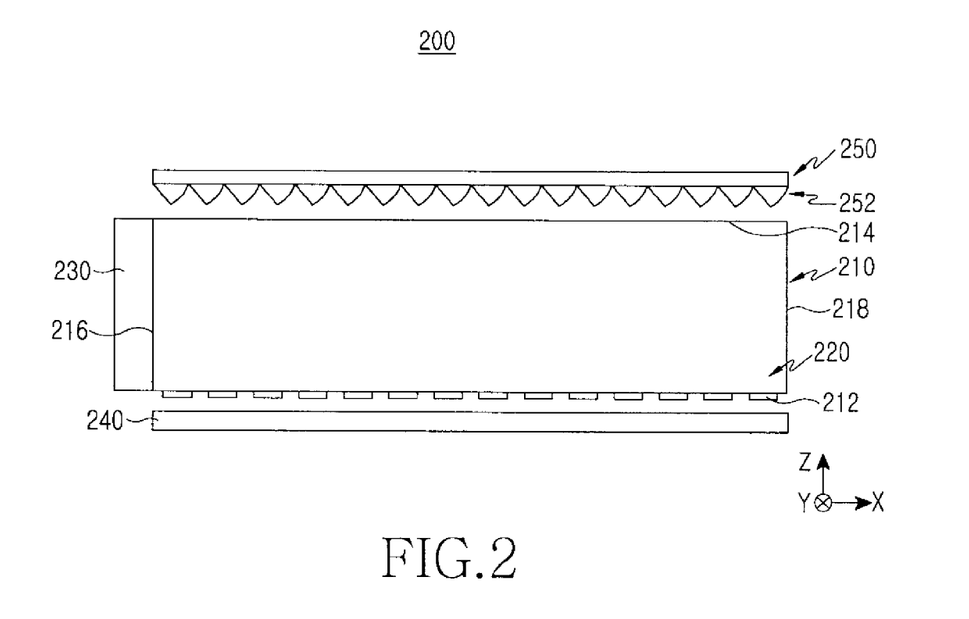
FIG. 2 is a side view illustrating a backlight unit according to an embodiment of the present invention.

FIG. 2 is a side view illustrating a backlight unit according to an embodiment of the present invention. As shown, the backlight unit 200 includes a reflecting sheet 240, a light source 230, a light guide panel 210, and a prism sheet 250. In the figure, a Z-axis is parallel with the illuminating direction of the backlight unit 200 (i.e., a normal line to an upper face 214 of the light guide panel 210), an X-axis is parallel with the advancing direction of light emitted from the light source 230, and a Y-axis is perpendicular to the X and Z axes.

The light guide panel 210 has opposite upper and lower faces 214 and 212, and opposite first and second side faces 216 and 218. The light source 230 is positioned exactly outside the first side face 216 of the light guide panel 210, and emits light toward the first side face 216. As the light source 230, a light emitting diode (LED), a laser diode (LD), a lamp or the like may be used. The light guide panel 210 guides light, which is introduced into the light guide panel 210 via the first side face 216, to the second side face 218 by means of internal reflection.

Figure 3A:
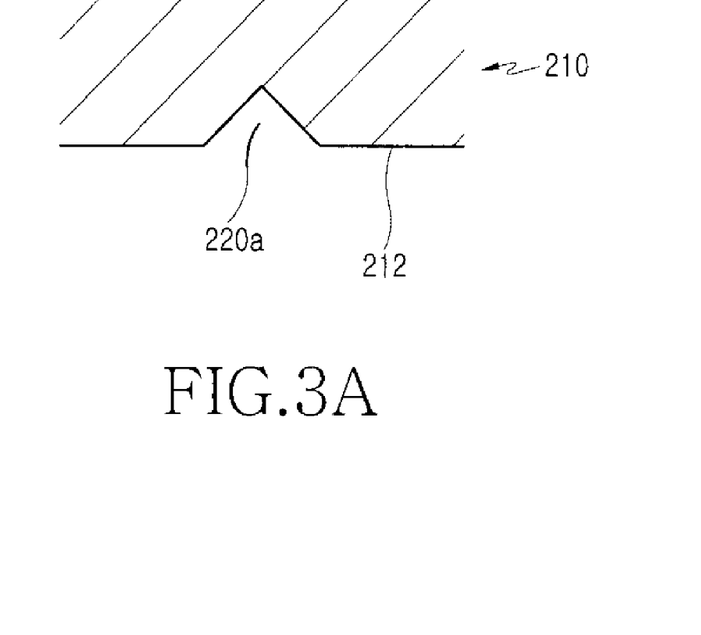
FIG. 3 is a cross-sectional view illustrating a dot pattern shaped like an edge of a cone.
Figure 3B:
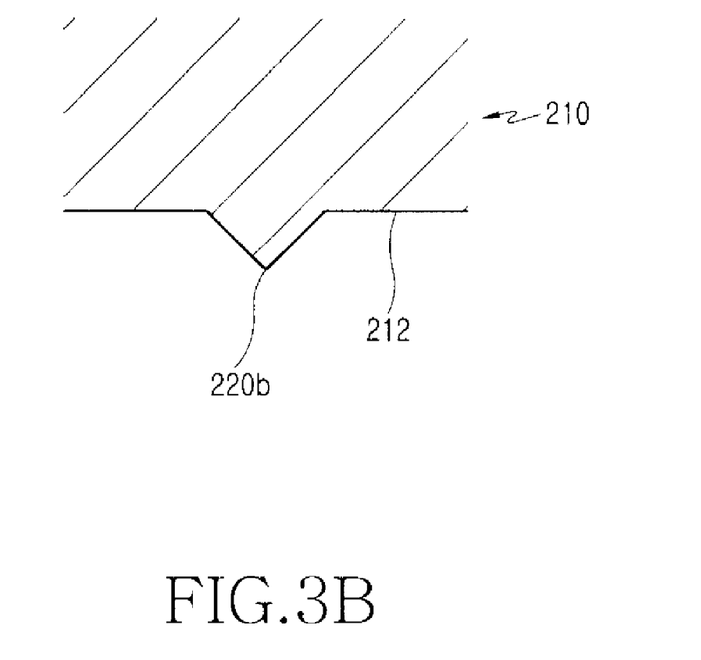

FIG. 3 is a cross-sectional view illustrating a dot pattern shaped like an edge of a cone. In FIG. 3, a figure (a) shows that a conical edge shaped dot pattern 220a is engraved in the lower face 212 of the light guide panel 210, and a figure (b) shows that a conical edge shaped dot pattern 220b is embossed on the lower face 212 of the light guide panel 210.

Referring back to FIG. 2, the respective dot patterns 220 reflects and diffuses incident light. That is, the respective dot patterns 220 break a total internal reflection condition at a boundary between the light guide panel 210 and an external air space so that light reflected and diffused from the respective dot patterns 220 is transmitted and refracted through the upper face 214 of the light guide panel 210.

Further, as light in the light guide panel 220 is attenuated while being advanced from the first side face 216, adjacent to the light source 230, toward the second side face 218, the luminance distribution exhibiting on the upper face 214 of the light guide panel 220 is also gradually reduced as it goes from the first side face 216 to the second side face 218. To remove such non-uniformity in luminance, the density of the dot pattern 220 can be made increased as it goes from the first side face 216 to the second side face 218. Herein, variation in density of the dot patterns 220 can be obtained by changing the number or the size of the dot patterns, where the density of the dot patterns 220 can be defined as an occupation area of the dot patterns 220 per unit area.

Figure 4:
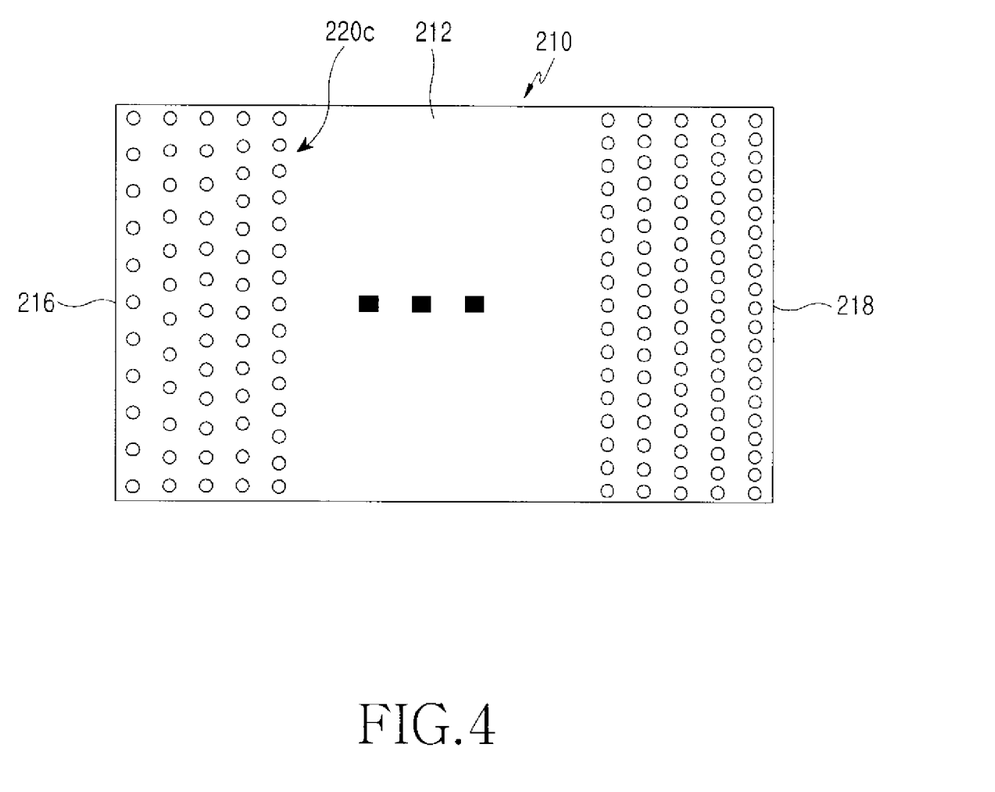
FIG. 4 is a view illustrating the dot patterns with its distribution varied.

FIG. 4 is a view illustrating the dot patterns with its distribution varied. As illustrated in the figure, dot patterns 220c formed on the lower face 212 of the light guide panel 210 all have the same shape and size, the number of the dot patterns 220c per unit area gradually increases as it goes from the first side face 216 to the second side face 218 of the light guide panel 210.

Referring back to FIG. 2, the reflecting sheet 240 is arranged such that the upper face thereof confronts the lower face 212 of the light guide panel 210, so as to reflect the light, transmitted through the lower face 212 of the light guide panel 210, toward the inside of the light guide panel 210 again. The reflecting sheet 240 has reflectivity of approximately 100%, but may have lower reflectivity if needed. For example, while the present embodiment has shown that the backlight unit 200 illuminates light in one direction, the backlight unit 200 may be used in two-way illumination. In this case, the reflectivity of the reflecting sheet 240 may be set to between 50% and 80%, and a diffusing sheet and a prism sheet may be further disposed in series under the reflecting sheet 240.

The prism sheet 250 is arranged such that the lower face thereof confronts the upper face of the light guide panel 210, and includes prism patterns 252 on the lower face of the prism sheet 250. Generally, the prism sheet 250, the prism patterns of which are formed on the lower face of the prism sheet, is called an inverse prism sheet. The prism patterns 252 are composed of planar inclined faces having diverse shapes and those having a curvature or a plane, and are engraved (in a recessed shape) in the upper face of the prism sheet 250, or otherwise are embossed (in a shape of projection) on the lower face of the prism sheet 250. Further, the prism patterns 252 can be formed such that they are attached on the lower face of the prism sheet 250 after being individually formed in a shape of projection. Preferably, the respective prism patterns 252 are configured such that the face thereof to which light, introduced from the light guide panel 210, is incident is made in a trapezoidal, planar inclined face, and the face from which the incident light is reflected is made in a curved or planar inclined face, so that the planar inclined face and the curved or planar inclined face are brought into line-contact with each other. The prism patterns 252 are periodically formed so as to have constant pitches parallel with each other, and are separated from each other or continuously formed, so as to transmit, collect and diffuse the light introduced from the light guide panel 210.

Figure 5A:
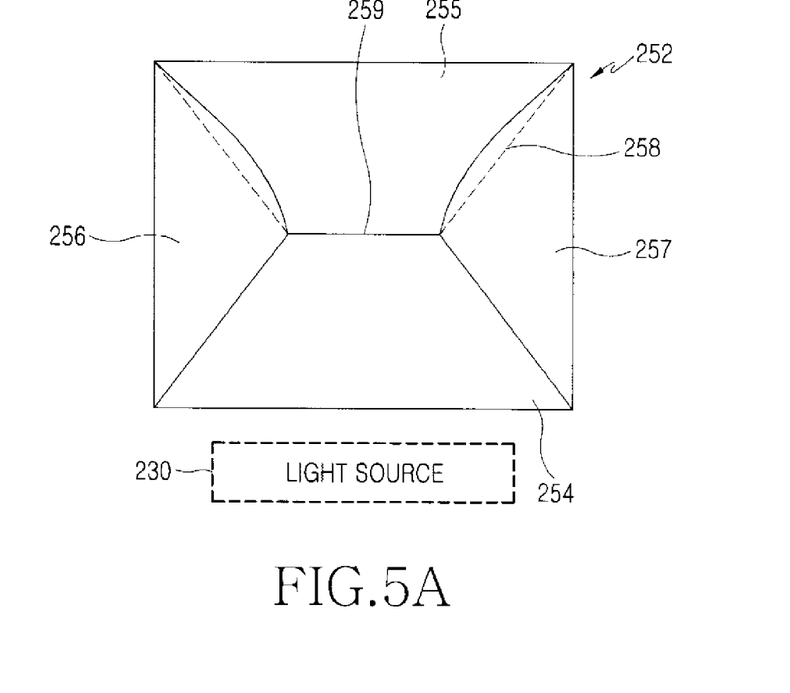
FIG. 5 is a plan view of a prism pattern shown in FIG. 2.
Figure 5B:
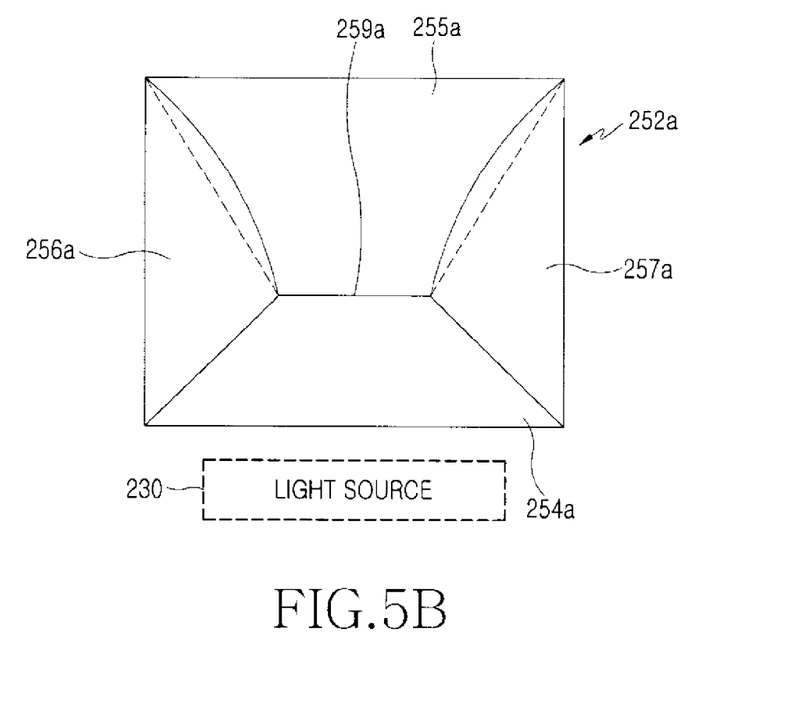

FIG. 5 is a plan view of the prism pattern 252 shown in FIG. 2. In FIG. 5, figure (a) shows that a boundary line 259, defined by line-contact between a first main inclined face 254 and a second main inclined face 255, is positioned at the center of the prism pattern 252, and figure (b) shows that a boundary line 259a, defined by line-contact between a first main inclined face 254a and a second main inclined face 255a, is deviated toward the light source 230. The prism patterns 252 and 252a are formed on the lower face of the prism sheet 250 so as to be confronted with the upper face 214 of the light guide panel 210. The prism patterns include the first main inclined faces 254 and 254a to which light introduced from the light guide panel 210 is incident, the second main inclined faces 255 and 255a which are brought into line-contact with the first main inclined faces 254 and 254a so as to reflect light incident via the first main inclined faces 254 and 254a, and two auxiliary inclined faces 256, 257 and 256a, 257a which confront each other between the first and second main inclined faces 254, 255 and 254a, 255a so as to define the side faces of the prism pattern 252 and 252a. Light incident from the light guide panel 210 is refracted at the first main inclined faces 254 and 254a, is incident to the second main inclined faces 255 and 255a, is reflected approximately perpendicularly, and finally is incident to a protecting sheet or an LCD panel. Conversely, light introduced into the auxiliary inclined faces 256, 257 and 256a, 257a of the prism sheet 250 is incident to the protecting sheet or the LCD panel after being refracted, so that some fluxes contribute to the improvement in front-side luminance, and some fluxes serve to increase the uniformity through being scattered.

It is preferable that the prism patterns 252 and 252a be of the base of a regular square or a rectangle so that a horizontal (Y-axis)-vertical (X-axis) pitch ratio is from 1:1 to 3:1. Further, the first main inclined faces 254 and 254a have a trapezoidal planar shape, and the second main inclined faces 255 and 255a have a trapezoidal planar shape or a trapezoidal curve shape.

Further, the auxiliary inclined faces 256, 257 and 256a, 257a are laterally symmetrical with each other about the boundaries 259 and 259a.

As illustrated in FIG. 5(a), the second main inclined face 255 has a trapezoidal planar shape, or a trapezoidal curve shape protruding outside from an imaginary trapezoidal plane 258.

Preferably, the boundaries 259 and 259a have a length ranging from 0% (corresponding to point-contact) to 67% of a horizontal pitch of the prism patterns 252 and 252a.

Figure 6A:
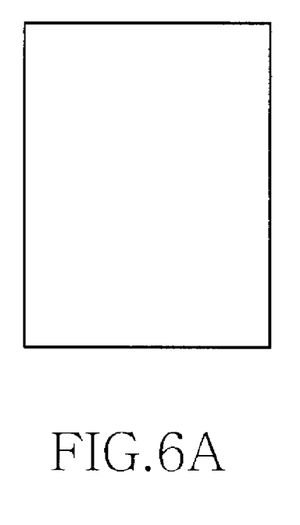
FIG. 6 is a view explaining the occurrence of bright lines according to a horizontal-vertical pitch ratio of the prism patterns.
Figure 6B:
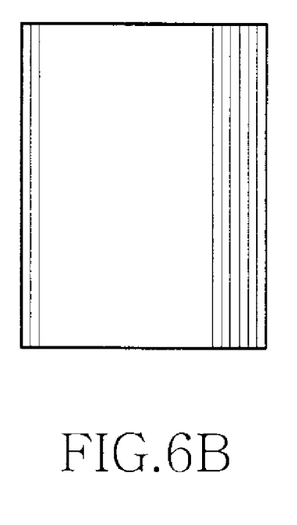
Figure 6C:
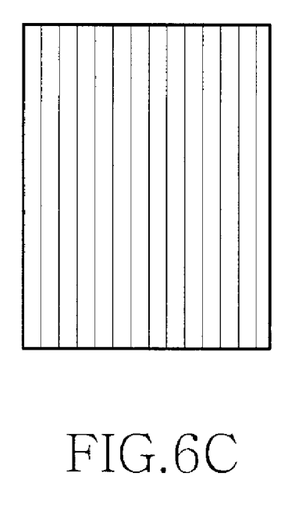

FIG. 6 is a view explaining the occurrence of bright lines according to a horizontal (a direction of LED arrangement)-vertical pitch ratio of the prism patterns 252. FIG. 6(a) shows the optical distribution generated from the prism sheet, in which horizontal/vertical pitches of the prism patterns are 10 μm, respectively, FIG. 6(b) shows the optical distribution generated from the prism sheet, in which horizontal/vertical pitches of the prism patterns are 20 μm and 10 μm, respectively, and FIG. 6(c) shows the optical distribution generated from the prism sheet, in which horizontal/vertical pitches of the prism patterns are 30 μm and 10 μm, respectively. Referring FIG. 6, it can be seen that if the horizontal/vertical pitch ratio of the prism patterns becomes 3.1 (in FIG. 6(c)), bright lines generally start to occur. Thus, it can be appreciated that if the horizontal/vertical ratio increases, the patterns are hardly used due to the occurrence of bright lines. Further, even when the height of prism pattern is large, the luminance is degraded, so that it is preferable that the height of the prism pattern be within the range of 6 to 18 μm.

Referring back to FIG. 5, according to the teachings of the present invention, the second main inclined face 255 is provided to have a curvature in order to maximize the front-side luminance of the light reflected from the second main inclined face 255 of the prism pattern 252. Further, in order to increase the front-side luminance, the main inclined faces 254 and 255 are brought into line-contact with each other so as to enlarge the size thereof relative to those of the auxiliary inclined faces 256 and 257. However, to improve uniformity, an angle between the auxiliary inclined faces, a vertical angle, is limited to between 30° and 68°.

Figure 7:
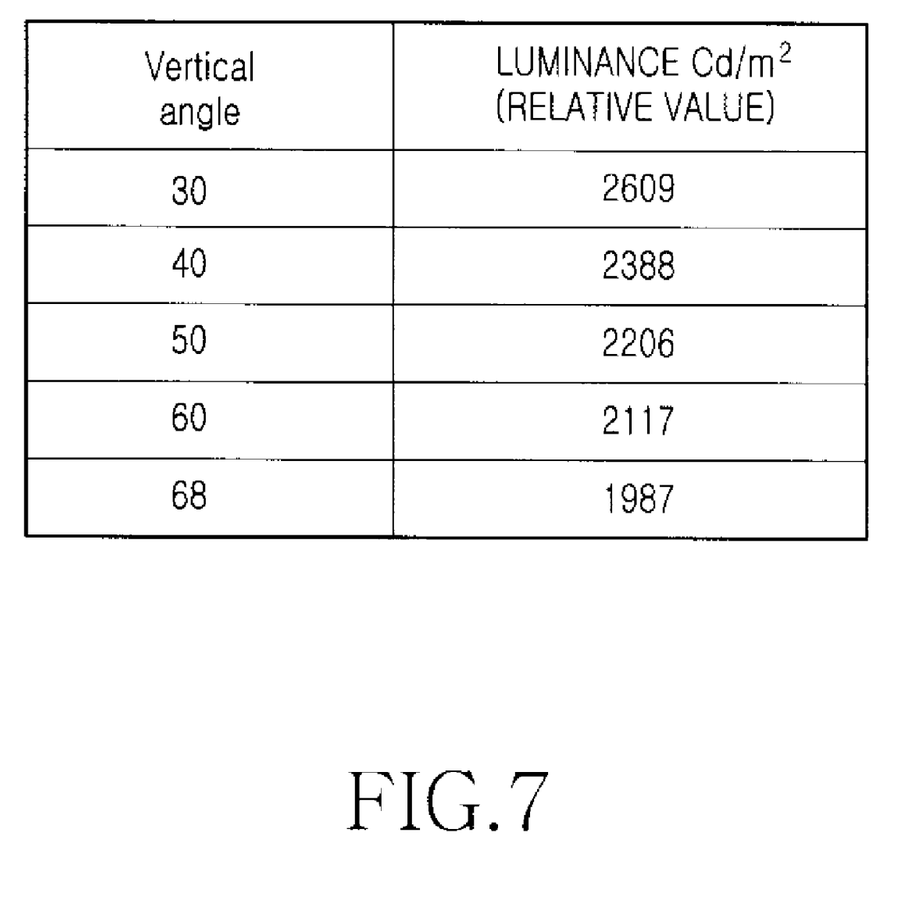
FIG. 7 is experimental data illustrating relative luminance according to a vertical angle.

FIG. 7 is experimental data illustrating relative luminance according to various vertical angles of the auxiliary inclined faces described above.

Generally, an appearance feature of a backlight unit (BLU) is degraded as the luminance increases. That is, the main inclined face is enlarged in order to increase the luminance, which means an increase of the main inclined face according to reduction in vertical angle, which reduces the area of the inclined face to thereby deteriorate the uniformity and the appearance feature. Thus, the vertical angle should be at least 30° or more. As can be seen in FIG. 7, when the vertical angle is 68°, the pattern is of a pyramid shape in point-contact, and if the angle is greater than the above, the main inclined face is reduced, whereas the auxiliary inclined face is enlarged. Then, the luminance is reduced so that the prism sheet does not operate properly. Thus, the vertical angle should not be greater than 68°.

Figure 8:
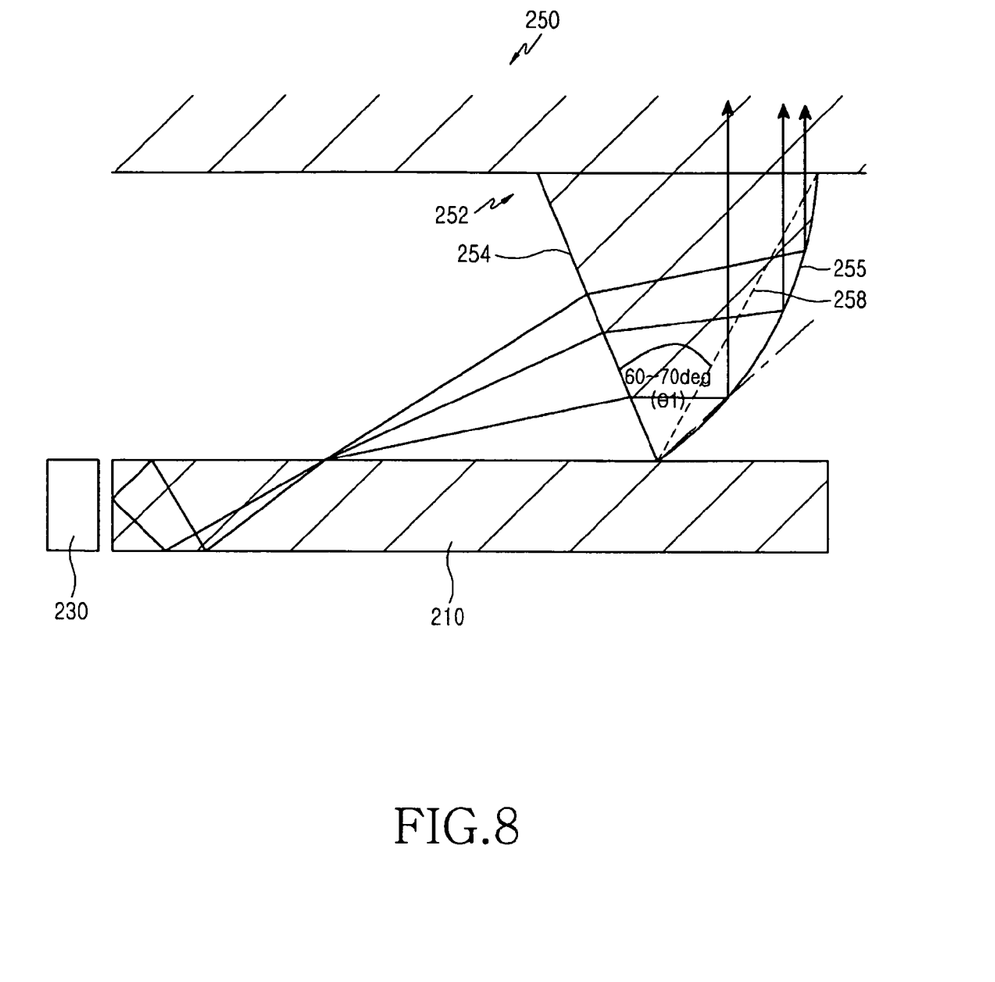
FIG. 8 is a view illustrating an optical path and a cross section of the prism pattern.

FIG. 8 is a view illustrating an optical path and a cross section of the prism pattern 252. When light is introduced from the light source 230 into the light guide panel 210, the light incident from the light source 230 repeats reflection and refraction in the light guide panel 210, then is emitted slantingly toward the upper face 214 of the light guide panel.

The light emitted slantingly toward the upper face 214 of the light guide panel is incident to the prism patterns 252 of the prism sheet 250, and the light slantingly incident to the first main inclined faces 254 is reflected from the planar or curved second main inclined faces 255, and is emitted substantially perpendicularly to the prism sheet 250.

Thus, the portion where the prism patterns are disposed is seen brightly because light is emitted perpendicular to the prism sheet 250, whereas the portion where the prism patterns are not disposed is seen dimmed because light is not emitted therethrough. Therefore, a difference occurs in the luminance between the portions where the prism patterns 252 are/are not disposed. To reduce this difference, the auxiliary inclined faces 256 and 257 are provided, so that some fluxes of light emitted along the auxiliary inclined faces 256 and 257 advance toward the front side so as to be used for an increase in luminance, and some fluxes thereof advance slantingly to diffuse, thereby improving the uniformity.

An angle $\theta 1$ between the main inclined faces 254 and 255 is between 60° to 70°, and between 64° to 69°, preferably. Here, the angle $\theta 1$ between the main inclined faces 254 and 255 is defined as an angle of an imaginary trapezoidal plane 258 for the first and second main inclined faces 254 and 255.

Figure 9:
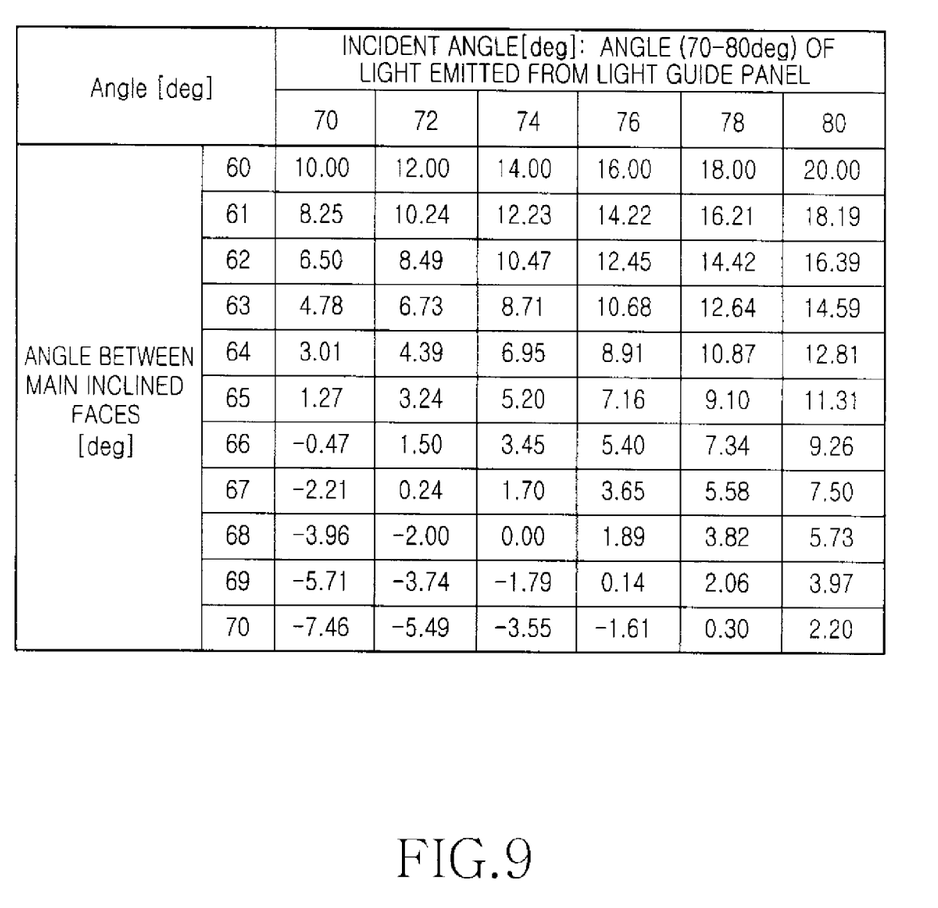
FIG. 9 is simulation data illustrating relationship between an angle in-between the main inclined faces of the prism sheet, a horizontal/vertical pitch of which is respectively 10 μm, and an incident angle of light which is incident to the prism sheet after being emitted from a light guide panel.

FIG. 9 is simulation data illustrating relationship between an angle in-between the main inclined faces of the prism sheet, a horizontal/vertical pitch of which is respectively 10 μm, and an incident angle of light which is incident to the prism sheet 250 after being emitted from the fight guide panel 210. In the simulation data, the numbers of the horizontal items indicate an angle of light incident to the prism sheet 250 after being emitted from the light guide panel 210, the numbers in a matrix indicate an angle of light transmitted to and emitted from the prism sheet 250 (0° means vertical emission of light in a normal direction). It can be appreciated from the simulation data that a condition on which the angle of light transmitted through and emitted from the prism sheet 250 becomes vertical is optimized in an angle between the main inclined faces between 64 and 69°.

Figure 10:
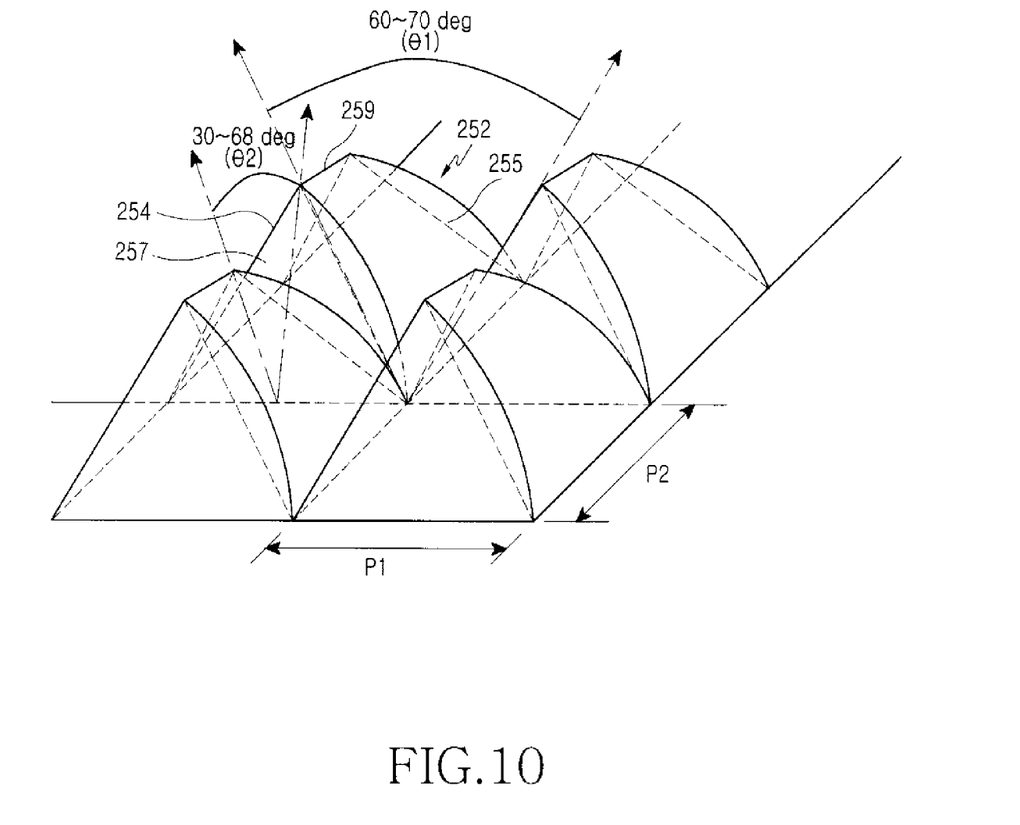
FIG. 10 is a view illustrating an inverted shape of continuously formed prism patterns.

FIG. 10 is a view illustrating an inverted shape of continuously formed prism patterns 252. The prism patterns 252 are periodically formed to have constant pitches parallel with each other, and are separated from each other, or otherwise are continuously formed. The prism patterns 252 have the same base size, which is limited to between 10 μm to 30 μm. Further, a ratio of a horizontal pitch P2 to a vertical pitch P1 is restricted to 3:1. The first main inclined face 254 is provided slantingly so as to have a trapezoidal planar shape. The second main inclined face 255 is brought into line-contact with the first main inclined face 254 so as to have a curved or planar shape. It is preferable that an angle θ1 between the main inclined faces 254 and 255 be of a range of 64° to 69°, and angle between the adjacent auxiliary inclined faces 256 and 257 of the prism patterns, that is, a vertical angle θ2 be of a range of 30° to 68°.

As set forth before, the backlight unit according to the present invention have the following effects.

First, since light emitted slantingly from the light guide panel is changed in its direction into a substantially perpendicular direction relative to the light guide panel, the luminance and the uniformity thereof of an image emitted from an LCD are greatly improved.

Second, since only one of prism sheets is used for each illumination direction, reduction in thickness and cost, and improvements in optical efficiency and luminance are obtained as compared to the prior art.

Third, since only one of prism sheets is used for each illumination direction, reduction in a Moire interference fringe and color separation is obtained.

In particular, the backlight unit according to the invention can be advantageously adapted to a mobile terminal such as a mobile phone or a monitor because the thickness thereof is thinner than that of the prior art.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A backlight unit comprising:
   a light guide panel having upper and lower faces at opposite end for guiding light between the upper and lower faces through internal reflection; and
   a prism sheet collecting and transmitting light from the light guide panel and having a plurality of prism patterns, each prism pattern having: a first main inclined face, to which light introduced from the light guide panel is incident; a second main inclined face having a curvature or a plane which reflects light incident from the first main inclined face; and two auxiliary inclined faces which are opposite to each other between the first and second main inclined faces, and define side faces of the prism pattern, wherein the prism patterns are provided on a lower face of the prism sheet to confront the upper face of the light guide panel.

2. The backlight unit according to claim 1, wherein the first main inclined face has a trapezoidal shape, and the second main inclined face has a curved shape.

3. The backlight unit according to claim 1, wherein an angle between the main inclined faces is ranged between 64° and 69°.

4. The backlight unit according to claim 1, wherein an angle between the auxiliary inclined faces of the adjacent prism patterns is ranged between 30° and 68°.

5. The backlight unit according to claim 1, wherein the prism patterns are continuously formed.

6. The backlight unit according to claim 5, wherein the density of the dot patterns increases as it goes from one side face to the other side face of the light guide panel.

7. The backlight unit according to claim 1, wherein the prism pattern has a regular square base shape or a rectangle base shape.

8. The backlight unit according to claim 7, wherein a horizontal-vertical ratio of the base of the prism pattern is ranged between 1:1 and 3:1.

9. The backlight unit according to claim 1, further comprising a reflecting sheet disposed underneath the light guide panel so as to in turn reflect light transmitted from the lower face of the light guide panel toward the light guide panel.

10. The backlight unit according to claim 1, wherein the light guide panel includes a plurality of dot patterns disposed on the lower face thereof so as to reflect and diffuse the incident light.

11. The backlight unit according to claim 1, further comprising a light source to generate light, which is introduced to the light guide panel.

12. The backlight unit according to claim 1, wherein the auxiliary inclined faces are laterally symmetrical with each other.

* * * * *